United States Patent [19]

Niederst

[11] 4,113,676

[45] Sep. 12, 1978

[54] AQUEOUS DISPERSIONS OF ESTERS STABILIZED WITH CARBODIIMIDES

[75] Inventor: Kenneth W. Niederst, Gibsonia, Pa.

[73] Assignee: PPG Industries, Inc., Pittsburgh, Pa.

[21] Appl. No.: 801,673

[22] Filed: May 31, 1977

[51] Int. Cl.$^2$ .................. C08G 18/83; C08G 63/76; C08K 5/29
[52] U.S. Cl. .................. 260/22 T; 260/22 TN; 260/29.2 E; 260/29.2 TN; 260/45.9 D; 260/860
[58] Field of Search .................. 260/29.2 TN, 29.2E, 260/22 T, 22 TN

[56] References Cited

U.S. PATENT DOCUMENTS

| | | | |
|---|---|---|---|
| 3,193,522 | 7/1965 | Neumann et al. | 260/2.5 BB |
| 3,193,523 | 7/1965 | Neumann et al. | 260/40 R |
| 3,193,524 | 7/1965 | Holtschmidt et al. | 260/2.5 AN |
| 3,463,758 | 8/1969 | Stewart | 260/75 NK |
| 3,639,353 | 2/1972 | Brown | 260/77.5 R |
| 3,709,846 | 1/1973 | Tsou | 260/29.2 TN |
| 3,716,502 | 2/1973 | Loew | 260/2.5 AK |
| 3,752,778 | 8/1973 | Dhein et al. | 260/29.2 TN |
| 3,893,959 | 7/1975 | Layman | 260/29.2 E |

Primary Examiner—Murray Tillman
Assistant Examiner—A. H. Koeckert
Attorney, Agent, or Firm—William J. Uhl

[57] ABSTRACT

Stabilizing aqueous dispersions of organic ester-containing compositions against degradation with carbodiimides is disclosed.

19 Claims, No Drawings

AQUEOUS DISPERSIONS OF ESTERS STABILIZED WITH CARBODIIMIDES

BACKGROUND OF THE INVENTION

Field of the Invention

The present invention relates to ester-containing compositions stabilized against degradation and more particularly relates to aqueous dispersions of organic ester-containing compositions stabilized against degradation.

Brief Description of the Prior Art

Polyesters, particularly poly(ester-urethanes) are of particular interest in the coatings industry because of their excellent film properties. The poly(ester-urethanes), for example, can be made elastomeric in character and result in tough films of high tensile strength with high elongation. Unfortunately, the polyesters including the poly(ester-urethanes) are subject to degradation probably due to hydrolysis because of the ester groups contained in the polymer. This degradation results in a gradual deterioration of the excellent film properties. Degradation is particularly a problem when the polyester and poly(ester-urethane) are dispersed in an aqueous medium and the dispersions are stored at high temperature, that is, about 50° C. and above.

It is known in the art that carbodiimides stabilize water-free polyesters and poly(ester-urethanes) against hydrolysis. See, for example, U.S. Pat. Nos. 3,193,522 and 3,193,523 to Neumann et al and U.S. Pat. No. 3,193,524 to Holschmidt et al, which relate to stabilization of polyesters, and U.S. Pat. No. 3,716,502 to Loew, which relates to the stabilization of poly(ester-urethanes). However, the prior art as exemplified by these references, for the most part, deals with polyester and poly(ester-urethane) molding or casting compositions which are prepared neat. Although the references also disclose that the carbodiimides can be used with polyester and poly(ester-urethane) coating compositions, these compositions are based on organic solvents and contain no added water.

It is not surprising that carbodiimides have not been used, prior to the present invention, to stabilize organic ester-containing compositions dispersed in aqueous medium. Carbodiimides are generally recognized in the art as being reactive with water. In fact, a well-known commercial supplier of carbodiimides cautions against contacting carbodiimides such as 2,2',6,6'-tetraisopropyl-diphenyl carbodiimide with water since they will react with water.

Surprisingly, it has been found that in spite of the reactivity of carbodiimides with water, they can be used to stabilize aqueous dispersions of organic ester-containing compositions, such as polyester and poly(ester-urethanes) against degradation.

SUMMARY OF THE INVENTION

In accordance with the present invention, a method for stabilizing aqueous dispersions of organic ester-containing compositions against degradation is disclosed. The method comprises incorporating into the compositions a stabilizing amount, usually about 0.10 to 10 percent by weight of a monocarbodiimide.

For stabilizing organic ester-containing compositions in aqueous dispersion, certain carbodiimides are preferred, that is, aromatic or cycloaliphatic carbodiimides substituted in the 2 and 2' position. Especially preferred is 2,2',6,6,'-tetraisopropyl-diphenyl carbodiimide.

DETAILED DESCRIPTION

The organic ester-containing compositions stabilized with carbodiimides in accordance with the present invention are preferably polymeric and contain a plurality of ester linakges

in the polymeric molecule, preferably in the backbone of the polymer. The preferred use for the compositions is as film forming and coating compositions. Examples of ester-containing polymeric materials are polyesters (including alkyds) which are condensation products of organic polycarboxylic acids and organic polyols, and polylactone-type polyesters.

With regard to the condensates of polycarboxylic acids and polyols, the polycarboxylic acid component of the polyester can be selected from monomeric polycarboxylic acids or anhydrides (where acids are referred to, it is understood that anhydrides of those acids which form anhydrides can be used in place of the acids) containing from 2 to 36 carbon atoms per molecule. The polycarboxylic acids can be saturated, aromatic, unsaturated and mixtures thereof. Examples of suitable polycarboxylic acids are adipic acid, succinic acid, dimer acid, phthalic acid, isophthalic acid, maleic acid and fumaric acid. In addition to polycarboxylic acids, minor amounts of some monobasic acid such as benzoic acid and stearic acid may also be used. Also, there may be employed higher polycarboxylic acids such as trimellitic acid. Also, lower alkyl esters of acids such as dimethylglutarate can be used.

Examples of suitable organic polyols are linear and branched aliphatic polyols, preferably containing from about 2 to 10 carbon atoms. Examples of suitable glycols include alkylene diols such as ethylene glycol, 1,2-propylene glycol and 1,4-butanediol. Polyols of higher functionality can also be used such as trimethylolpropane, as well as higher molecular weight polyols such as those produced by oxyalkylating low molecular weight polyols. Some monofunctional alcohols such as n-propyl alcohol and n-butyl alcohol may also be included in the polyol component.

Included within the description of polyester are the so-called alkyds which are polymeric esters prepared from condensing an organic polyol, such as those mentioned above, with a fatty acid. Modifying acids such as the saturated, unsaturated and aromatic acids mentioned above can also be used with the fatty acid in the preparation of the alkyd resins. The fatty acids are characterized by containing at least a portion of unsaturated fatty acids. The fatty acids have iodine values of 90 and higher as determined by ASTM D-1467. Examples of suitable fatty acids include the acid derived from linseed oil, safflower oil, tung oil, sunflower oil, tall oil esters, hydrated castor oil, and the like. Besides polyesters, modified polyesters such as poly(ester-urethanes) are included within the definition of organic ester-containing compositions.

The poly(ester-urethanes) are prepared by preparing the polyester such as described above such that it is hydroxy containing. The polyester can then be reacted with any desired polyisocyanate to form the desired poly(ester-urethane). The organic polyisocyanate can be aliphatic or an aromatic polyisocyanate or mixture of the two. Also, for coating compositions, aliphatic polyisocyanates are preferred because it has been found that these provide better color stability in the resultant coating. Also, for coating applications, diisocyanates are preferred, although higher polyisocyanates can be used in place of or in combination with diisocyanates and/or monoisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and are actually preferred because of color stability and imparting hardness to the resultant coating. Examples include 1,4-cyclohexyl diisocyanate and 4,4'-methylene-bis(cyclohexyl isocyanate) which is commercially available from E. I. duPont Nemours under the trademark HYLENE W ®. Examples of suitable higher polyisocyanates are 1,2,4-benzenetriisocyanate and polymethylene polyphenyl isocyanate. Examples of suitable monoisocyanates are cyclohexyl isocyanate and toluene isocyanate.

The organic ester-containing compositions such as those described above can be made water-dispersible by the incorporation of water-solubilizing groups into the composition. Examples of water-solubilizing groups would be the preparation of organic esters with ionic salt groups in the ester molecule. For example, with polyesters prepared from organic polycarboxylic acids and organic polyols, the polyester can be prepared with unreacted carboxylic acid groups (for example, acid numbers greater than 20 and usually between about 40 and 60). These acid groups can be subsequently neutralized with inorganic or organic bases such as sodium hydroxide, potassium hydroxide, ammonia and tertiary amines to form polymers containing ionic (anionic) salt groups.

The polylactone-type esters prepared from polyhydroxy carboxylic acids such as dimethylolpropionic acid also contain unreacted COOH groups which can be neutralized to form anionic salt groups.

The amount of aqueous medium employed in the aqueous dispersions is not unduly critical. The aqueous medium will amount to 15 to 80 percent by weight, preferably 20 to 70 percent by weight, based on total weight of organic ester-containing composition and aqueous medium. Water is a necessary ingredient of the aqueous medium, being present in an amount of at least 30 and preferably at least 45 percent by weight based on total weight of the aqueous medium with co-solvent constituting the remainder of the medium.

The term "dispersion" as used within the context of the present invention is believed to be a two-phase, translucent, aqueous-organic ester system in which the ester is the dispersed phase. For measuring the particle size of the dispersed phase, the polyester is thinned with water to form a one percent solids dispersion, the average particle size is less than 10 and preferably less than 5, and most preferably 1 micron or less as determined by light transmission. The term dispersion is also intended to cover homogeneous aqueous solutions which appear optically clear.

The ester can be dispersed in a number of ways. Preferably, the ester whether neat or in solution is added incrementally to an aqueous dispersing medium with agitation. Alternately, the aqueous dispersing medium can be added incrementally to the ester with stirring.

After the ester has been prepared, additional solvent can be added before dispersion or, for that matter, after the ester has been dispersed in aqueous medium so as to control the viscosity of the dispersion and particle size of the dispersed phase or to enhance film coalescence and overall coating properties. Examples of suitable solvents are alcohols, ketones, ethers, esters, hydrocarbons and chlorocarbons. The solvents should be water-soluble if they are added after dispersion and examples would include ketones and ethers. Water-insoluble solvents such as chlorocarbons or hydrocarbons should not be added to the resin after it is dispersed.

In addition to the ester, crosslinking or curing agents may also be added to the dispersion. These agents cause a chemical crosslinking after the coating is deposited either at room temperature or elevated temperature depending upon the coating system. Examples of suitable crosslinking agents are those which are reactive with unreacted OH and COOH in the ester. Examples are etherified aminoplast resins, masked and blocked isocyanates and epoxy-containing materials. Water-soluble crosslinking agents such as the aminoplast are simply added to the aqueous dispersion, whereas more hydrophobic materials such as some organic isocyanates and epoxy-containing organic materials are preferably dissolved or emulsified in a solvent which is compatible with water.

The organic carbodiimides which may be used in stabilizing the aqueous dispersions of organic ester-containing compositions described above may be selected from aliphatic, cycloaliphatic, aromatic, monocarbodiimides such as, for example, aliphatic types such as diisopropylcarbodiimide, methyl-tert-butyl-carbodiimide, cycloaliphatic types such as dicyclohexyl-carbodiimide and aromatic types such as diphenyl-carbodiimide, di-p-tolyl-carbodiimide.

Particularly preferred are aromatic or cycloaliphatic carbodiimides such as aromatic or cycloaliphatic monocarbodiimides which are substituted in the 2 and 2' position with an alkyl group having from 1 to 18 carbon atoms such as, for example, methyl, ethyl, propyl, isopropyl, butyl, isobutyl, dodecyl, octadecyl, allyl, crotyl, oleyl and the like; aralkyl groups such as, for example, benzyl, beta-phenyl ethyl, xylyl and the like; aryl groups such as, for example, phenyl, tolyl, naphthyl, and the like; alkoxy groups with alkyl residues having from 1 to 18 carbon atoms such as, for example, methoxy, ethoxy, butoxy and the like; halogen atoms such as, for example, chlorine, bromine, fluorine, iodine and the like; nitro groups; carbalkoxy groups such as, for example, carbomethoxy, carbethoxy and the like; cyano groups and the like. Of course, carbodiimides which contain substituents other than the aforementioned types on the aromatic or cycloaliphatic rings can be used. Especially suited are those carbodiimides which are tetra-substituted on the aromatic or cycloaliphatic ring in the 2,2' and 6,6' positions. The most preferred are 2,2' and 6,6'-substituted aromatic or cycloaliphatic carbodiimides wherein the substituent is alkyl or alkoxy.

The substituted carbodiimides appear to stabilize the aqueous dispersion for longer periods of time than unsubstituted carbodiimides and the aliphatic carbodiimides such as diisopropyl carbodiimide. Examples of substituted aromatic and cycloaliphatic carbodiimides are: 2,2'-dimethyl-diphenyl carbodiimide, 2,2'-diisopropyl-diphenyl carbodiimide, 2-dodecyl-2'-n-propyl diphenyl carbodiimide, 2,2'-diethoxy-diphenyl carbodi imide, 2-0-dodecyl-2'-0-ethyl-diphenyl carbodiimide, 2,2'-dichlorodiphenyl carbodiimide, 2,2'-ditolyl-diphenyl carbodiimide, 2,2'-dibenzyldiphenyl carbodiimide, 2,2'-dinitro-diphenyl carbodiimide, 2-ethyl-2'-isopropyl-diphenyl carbodiimide, 2,6,2',6'-tetraethyl-diphenyl carbodiimide, 2,6,2',6'-tetra-secondary-butyl-diphenyl carbodiimide, 2,6,2',6'-tetraethyl-3,3'-dichloro-diphenyl carbodiimide, 2,6,2',6'-tetraisopropyl-3,3'-dinitro-diphenyl carbodiimide, 2-ethyl-cyclohexyl-2-isopropyl-phenyl carbodiimide, 2,4,6,2',4',6'-hexaisopropyl-diphenyl carbodiimide, 2,2'-diethyl-dicyclohexyl carbodiimide, 2,6,2',6'-tetraisopropyl-dicyclohexyl carbodiimide, 2,6,2',6'-tetra-ethyl-dicyclohexyl carbodiimide and 2,2'-dichlorodicyclohexyl carbodiimide, 2,2'-dicarbethoxy-diphenyl carbodiimide, 2,2'-dicyano-diphenyl carbodiimide and the like.

These carbodiimides can be prepared in the manner known in the art such as, for example, by the desulfurization of the corresponding substituted thioureas with heavy metal oxide or with alkaline sodium hypochloride solution. They can be prepared in accordance with the teachings of U.S. Pat. Nos. 2,853,473 or 2,853,518 by reacting an isocyanate with a phospholine or phospholide. The preferred substituted aromatic carbodiimides can also be prepared in accordance with the procedures set forth in U.S. Pat. No. 3,502,722 by heating an ortho-substituted aromatic monoisocyanate in the presence of a tertiary amine, metal salts of carboxylic acids or non-basic organo metallic compounds.

The amount of carbodiimide added to the aqueous dispersion of the ester-containing composition should be that sufficient to stabilize the organic ester-containing composition against degradation. This can be determined by measuring the change in acid value of the dispersion as a function of time. When the ester degrades such as by hydrolysis, carboxylic acid groups will be generated and the acid value will rise. Preferably, a carbodiimide will be added to the aqueous dispersion in an amount sufficient to keep the acid value from increasing above 10 percent of its original value when the aqueous dispersion is stored at 50° C. for 30 days.

Although the presence of small amounts of carbodiimide in accordance with this invention will improve the stability of the ester-containing composition somewhat, it is preferred that a quantity in an amount of from about 0.1 to 10 percent, more preferably from 3 to 7 percent by weight be used, based on total weight of the organic ester.

The carbodiimide may be incorporated into the aqueous dispersion by first dissolving the carbodiimide in the ester-containing composition which is either neat in melt form or in solution and then dispersing the organic ester-containing composition in the aqueous medium. Alternately, the carbodiimide can be dissolved in a co-solvent miscible with the organic ester and the carbodiimide solution added to an aqueous dispersion of the organic ester.

The invention is further illustrated by the following examples in which parts are by weight unless otherwise indicated.

EXAMPLE I

The following example shows the effect of various carbodiimides in stabilizing against hydrolysis an aqueous dispersion of a poly(esterurethane). The carbodiimides evaluated were: diisopropyl carbodiimide, dicyclohexyl carbodiimide and 2,2',6,6'-tetraisopropyl-diphenyl carbodimide. The dispersions were stored at 72° F. (22° C.) for 7 days and for 30 days at 120° F. (49° C.).

The poly(ester-urethane) was prepared from the following charge:

| Ingredient | Parts by Weight |
|---|---|
| N-methyl-2-pyrrolidone solvent | 447 |
| poly(1,4-butanediol) adipate[1] | 650 |
| dimethylolpropionic acid | 87 |
| neopentyl glycol | 54 |
| dibutyltin dilaurate catalyst | 0.3 |
| 4,4'-methylene-bis(cyclohexyl isocyanate)[2] | 689 |
| dimethylethanolamine | 47.5 |
| deionized water | 2172 |
| ethylene diamine | 43 |

[1]Sold commercially by Witco Chemical Corp. as FORMREZ® 13-35 (molecular weight 1000-1050).
[2]Sold commercially by E. I. duPont de Nemours as HYLENE W®.

The poly(1,4-butanediol) adipate, dimethylolpropionic acid, neopentyl glycol, 4,4'-methylene-bis(cyclohexyl isocyanate) and dibutyltin dilaurate were charged to a reaction vessel and heated to about 80° C. under a nitrogen atmosphere for about 5 hours to form an NCO prepolymer.

The NCO prepolymer (which also contained unreacted COOH groups) was cooled to room temperature and neutralized with dimethylethanolamine to 75 percent of the total neutralization equivalent. Deionized water was added slowly to disperse the neutralized NCO prepolymer which was then chain extended by slowly adding the ethylene diamine. The resulting poly(ester-urethane) had a solids content of 37 percent and was a thixotropic dispersion. The resin was essentially free of NCO groups as determined by an IR scan.

To six separate portions of the aqueous polyurethane dispersion prepared as described above were added 2,2',6,6'-tetraisopropyl-diphenyl carbodiimide, diisopropyl carbodiimide and dicyclohexyl carbodiimide, each at 2 and 5 percent by weight concentrations. The carbodiimides were added to the aqueous poly(ester-urethane) dispersions as 25 percent solid solutions in N-methyl-2-pyrrolidone. The carbodiimide-containing dispersions were then aged for 7 days at 72° F. (22° C.) and for 30 days at 120° F. (49° C.). The acid value of the poly(ester-urethanes) was measured after aging. Also, free films of the carbodiimide-containing poly(ester-urethanes) were prepared by drawing down the aqueous dispersion over a polypropylene substrate with a 6-mil drawbar and curing the film at 55° C. for 15-30 minutes. The films were stripped from the substrate and stored along with the aqueous dispersion for 7 days at 22° C. and for 30 days at 49° C., after which the tensile strength and percent elongation (ASTM D-638-72) were measured. The results are reported in the table below. Also included in the table is a control experiment in which the aqueous poly(ester-urethane) contained no carbodiimide. The acid value of the dispersion as freshly prepared was measured and the dispersion was then aged for 30 days at 120° F. (49° C.).

Hydrolytic Stability of Poly(ester-urethane) Aqueous Dispersions
Containing Various Carbodiimides and of Free Films Prepared Therefrom

| Carbodiimide | Tensile Strength in psi (kN/cm$^2$) | % Elongation | Acid Value[1] | Δ Acid Value[2] | pH | 30 days at 120° F. (49° C.) | | | | |
|---|---|---|---|---|---|---|---|---|---|---|
| | | | | | | Tensile Strength in psi (kN/cm$^2$) | % Elongation | Acid Value[1] | Δ Acid Value | pH |
| Control[5] | 3500 (14,115) | 290 | 28.5 | | 7.9 | 2000 (13,780) | 170 | 34 | +19.3[3] | 7.85 |
| | 7 days at 22° C. | | | | | | | | | |
| 2,2',6,6'-tetra-isopropyl-diphenyl carbodiimide | | | | | | | | | | |
| 2% | 3500 (24,115) | 260 | 29.7 | + 4.2 | 8.1 | 2850 (19,637) | 270 | 30.2 | + 1.7[4] | 7.95 |
| 5% | 3580 (24,666) | 340 | 29.8 | + 4.5 | 8.2 | 3080 (21,221) | 300 | 23.5 | −21.2[4] | 8.15 |
| diisopropyl carbodiimide | | | | | | | | | | |
| 2% | 2530 (17,432) | 260 | 19.8 | −30.5 | 9.0 | 3050 (21,015) | 228 | 23.5 | +18.7[4] | 8.7 |
| 5% | 5200 (35,828) | 350 | 10.0 | −64.9 | 9.5 | 3000 (20,670) | 270 | 16.7 | +67.0[4] | 9.3 |
| dicyclohexyl carbodiimide | | | | | | | | | | |
| 2% | 2400 (16,536) | 180 | 24.1 | −15.4 | 8.4 | 3000 (20,670) | 270 | 30.8 | +27.8[4] | 8.2 |
| 5% | 1900 (13,091) | 210 | 15.4 | −45.9 | 9.2 | 2600 (17,914) | 220 | 23.6 | +53.2[4] | 9.0 |

[1] Based on resin solids.
[2] Percent change in acid value of control (28.5) and carbodiimide-containing dispersions aged for 7 days at 22° C.
[3] Percent change in acid value of control (28.5) and control aged for 30 days at 120° F. (49° C.).
[4] Percent change in acid value of carbodiimide-containing dispersions aged 7 days at 22° C. and those aged 30 days at 120° F. (49° C.).
[5] Control was freshly prepared aqueous dispersion free of carbodiimide.

The data in the table above shows the difference in stabilizing efficiency between the sterically hindered 2,2',6,6'-tetraisopropyldiphenyl carbodiimide and the unhindered diisopropyl and dicyclohexyl carbodiimides. Looking at the control example first, a freshly prepared aqueous poly(ester-urethane) dispersion significantly increases in acid value when the dispersion is stored in a hot room for 30 days at 120° F. (49° C.). This increase in acid value is 19.3 percent and is an indication of degradation probably of hydrolysis. What is probably occurring is that the ester units in the polymer chain are being hydrolytically cleaved resulting in the generation of free carboxylic acid groups which results in an increase in acid value. Adding the 2,2',6,6'-tetraisopropyldiphenyl carbodiimide at both 2 and 5 percent by weight concentrations results in a marked stabilizing effect. After these dispersions were stored for 7 days at 120° F. (49° C.), there was only a slight increase in the acid value over the control. Further, when the aqueous dispersions containing the 2 percent loadings of 2,2',6,6'-tetraisopropyl-diphenyl carbodiimide were stored for 30 days at 120° F. (49° C.), there was only 1.7 percent increase in acid value indicating that the carbodiimide was still exerting its stabilizing effect. The result of the 5 percent loading of the 2,2',6,6'-tetraisopropyl-diphenyl carbodiimide is somewhat interesting in that there was an actual decrease in acid value observed while storing over 30 days at 120° F. (49° C.). The decrease in acid value could be due to the carbodiimide reacting with the unneutralized carboxylic acid groups in the polyurethane.

Evidence for the carbodiimides reacting with unneutralized carboxylic acid groups is shown with the diisopropyl and the dicyclohexyl carbodiimide stabilized dispersions. After standing for 7 days at 22° C., both dispersions at both the 2 and 5 percent carbodiimide levels sharply decreased in acid value. However, after storing for 30 days at 49° C., there was an increase in the acid value over that obtained after storing for 7 days at 22° C. This increase in acid value indicates that hydrolysis is occurring in spite of the carbodiimide. This phenomenon may be due to both the diisopropyl and dicyclohexyl carbodiimide reacting very quickly with any carboxylic acid groups available. As a result, although these carbodiimides show an initial stabilization, they are expanded rather quickly and are not available to offer any long-term stability.

A possible reason for the observed differences between the 2,2',6,6'-tetraisopropyl-diphenyl carbodiimide and the diisopropyl and dicyclohexyl carbodiimides may be structural. The substituted aromatic carbodiimide is sterically hindered and this may prevent the carbodiimide from reacting too quickly with the unneutralized carboxylic acid groups (and possibly with water). As a result, the sterically hindered carbodiimide is around longer to exert a stabilizing effect.

EXAMPLE II

A poly(ester-urethane) similar to that of Example I was prepared with the exception that hydrazine was used in place of ethylene diamine. The poly(ester-urethane) was prepared from the following charge:

| Ingredient | Parts by Weight |
|---|---|
| N-methyl-2-pyrrolidone solvent | 68.8 |
| dimethylolpropionic acid | 13.5 |
| neopentyl glycol | 8.3 |
| FORMREZ F 13-35 | 100.0 |
| dibutyltin dilaurate catalyst | 0.08 |
| HYLENE W | 102 |
| dimethylethanolamine | 7.7 |
| deionized water | 307.2 |
| hydrazine hydrate | 5.85 |
| acetal acetone | 1.2 |

The preparation of the polyurethane and its dispersion in water was accomplished as generally described in Example I.

Four samples of the aqueous polyurethane dispersion were taken for testing. Each sample was formulated into a clear lacquer composition by blending 1000 parts by weight of the polyurethane dispersion with 10 parts by weight of a fluorocarbon wetting agent commercially available from 3M Company as FC-430, 250 parts of hexyl CELLOSOLVE (monohexyl ether of ethylene glycol) and 400 parts of deionized water.

To three of the lacquer compositions were added 2,2',6,6'-tetraisopropyl-diphenyl carbodiimide in 1, 3 and 5 percent by weight concentrations, based on poly(ester-urethane) resin solids; the carbodiimide being added as a 25 percent by weight solids solution in N-methyl-2-pyrrolidone. The fourth lacquer composition with no added carbodiimide served as a control.

The dispersions were aged at 120° F. (49° C.) for varying times as reported in the table below. After aging, the viscosity and pH of the dispersions were measured. Also, free films of the dispersions were prepared by spraying the aqueous dispersion (after aging) over a polypropylene substrate and curing the film at 250° F. (121° C.) for 30 minutes. The films (about 2 mils) were stripped from the substrate and the tensile strength and percent elongation (ASTM D-638-72) were measured. The results are reported in the table below.

acid, phthalic anhydride, isophthalic acid and 151 parts of the trimellitic anhydride. The reaction mixture was sparged with inert gas and heated to 380°–420° F. (193°–216° C.), until an acid value of 20-25 was obtained. The reaction mixture was cooled to 360° F. (182° C.), charged with 151 parts of the trimellitic anhydride and held at 360° F. (182° C.) until an acid value of 43-47 was obtained. The reaction mixture was then thinned with the butyl CELLOSOLVE, cooled to 160° F. (71° C.) and neutralized with the dimethylethanolamine.

Hydrolytic Stability of Poly(ester-urethane) Aqueous Dispersions Containing 2,2',6,6'-Tetraisopropyl-Diphenyl Carbodiimide

| % Carbodiimide | Days at 120° F. (49° C.) | Tensile in grams/cm$^2$ × 10$^5$ | % Elongation | Viscosity[1] | pH | Days at 120° F. (49° C.) | Tensile in grams/cm$^2$ × 10$^5$ | % Elongation | Viscosity | pH |
|---|---|---|---|---|---|---|---|---|---|---|
| 0 | 0 | 4.55 | 295 | 25.2 | 7.64 | 18 | 3.05 | 265 | 13.0 | 7.42 |
| 1 | 0 | 4.50 | 320 | 24.8 | 7.70 | 14 | 3.40 | 235 | 13.6 | 7.30 |
| 3 | 0 | 4.20 | 275 | 24.7 | 7.59 | 14 | 3.50 | 270 | 11.8 | 7.53 |
| 5 | 0 | 4.70 | 330 | 25.8 | 7.64 | 14 | 3.55 | 275 | 12.0 | 7.64 |
| 0 | 33 | 1.45 | 45 | 11.2 | 7.27 | 60 | 1.15 | 10 | 10.2 | 7.12 |
| 1 | 29 | 1.50 | 70 | 11.6 | 7.31 | 56 | — | — | 11.0 | 7.37 |
| 3 | 29 | 2.25 | 250 | 11.0 | 7.60 | 56 | 1.45 | 15 | 10.8 | 7.41 |
| 5 | 29 | 2.25 | 250 | 11.0 | 7.60 | 56 | 1.40 | 10 | 10.8 | 7.41 |

[1]Viscosities reported are Efflux Viscosities, determined at 72° F. (22° C.) with a Ford No. 4 cup on an Efflux Viscometer as supplied by Gardner Laboratories of Bethesda, Maryland.

The data in the table above shows that at the 1 percent level, the 2,2',6,6'-tetraisopropyl-diphenyl carbodiimide is not particularly effective in stabilizing the viscosity or in maintaining the tensile strength and percent elongation of the cured films. At 3 percent levels, the carbodiimide shows some stabilizing effect. Films deposited from the aqueous dispersions which were aged for 29 days had higher tensile strengths and much higher percent elongations than control films which contained no carbodiimide. At the 5 percent levels, the 2,2',6,6'-tetraisopropyl-diphenyl carbodiimide shows a significant stabilizing effect in maintaining the tensile strength and percent elongation in films which were deposited from dispersions previously aged for 29 days.

It should be pointed out that in this example the retention of elongation and tensile strength in the cured films was not as great as that exhibited in Example I. One reason for this may have been the relatively high curing temperature of the film, i.e., 121° C. versus 49° C. of Example I. It would seem that for the best maintenance of physical properties such as tensile strength and elongation, the carbodiimide-containing, ester-containing composition should preferably be curable at temperatures less than 200° F. (93° C.) and more preferably less than 150° F. (66° C.).

EXAMPLE III

An aqueous polyester dispersion was prepared from the following charge:

| Ingredient | Parts by Weight |
|---|---|
| deionized water | 140 |
| neopentyl glycol | 1234 |
| adipic acid | 346 |
| phthalic anhydride | 527 |
| isophthalic acid | 586 |
| trimellitic anhydride | 302 |
| butyl CELLOSOLVE | 1157 |
| dimethylethanolamine | 183 |
| deionized water | 406 |

The first portion of the deionized water and neopentyl glycol were charged under a nitrogen blanket to a reaction vessel, equipped with glycol recovery equipment. The neopentyl glycol was melted followed by the addition at 100° F. (38° C.) with agitation of the adipic The neutralized polyester was cooled to 120° F. (49° C.) and then dispersed in deionized water. The dispersed resin contained about 60 percent solids and had a Gardner-Holdt viscosity of Z to Z-2 at this solids content.

The aqueous polyester dispersion prepared as described above was aged at 72° F. (22° C.) for 30 days and another sample was aged at 120° F. (49° C.) for 30 days. The changes in milliequivalents of acid and base, as well as the changes in acid value and percentage solids is reported in the table below.

For the purpose of comparison, a 2.5 percent by weight (based on polyester resin solids) of 2,2',6,6'-tetraisopropyl-diphenyl carbodiimide was added to the aqueous polyester as a 25 percent solids solution in butyl CELLOSOLVE (monobutyl ether of ethylene glycol). The carbodiimide-containing polyester was then aged at 72° F. (22° C.) for 30 days and another sample aged at 120° F. (49° C.) for 30 days. The changes in milliequivalents of acid, base, as well as changes in acid value and percentage solids is reported in the table below.

Table

Stabilizing Effect of 2,2',6,6'-Tetraisopropyl-diphenyl Carbodiimide on Aqueous Polyester Dispersions

| | Aqueous Polyester Dispersion | | Aqueous Polyester Dispersion Plus Carbodiimide | |
|---|---|---|---|---|
| | 30 days at 72° F. (22° C.) | 30 days at 120° F. (49° C.) | 30 days at 72° F. (22° C.) | 30 days at 120° F. (49° C.) |
| Milliequivalents of acid | 0.535 | 0.574 | 0.535 | 0.515 |
| Milliequivalents of base | 0.411 | 0.397 | 0.411 | 0.361 |
| % solids | 52.2 | 49.4 | 52.2 | 50.0 |
| acid value[1] | 57.5 | 65.2 | 60.0 | 57.8 |
| Δ acid value[2] | + 13.3% | | − 3.7% | |

[1]Acid value determined on 100% resin solids ASTM D-1639-70.
[2]Δ acid value is the change in acid value between sample aged at 72° F. (22° C.) for 30 days and sample aged at 120° F. (49° C.) for 30 days.

EXAMPLE IV

An aqueous alkyd dispersion was prepared from the following charge:

| Ingredient | Parts by Weight |
| --- | --- |
| safflower oil | 78.3 |
| pentaerythritol | 73.2 |
| dibutyltin oxide | 0.6 |
| phthalic anhydride | 61.8 |
| isophthalic acid | 22.2 |
| CARBOWAX 4000[1] | 26.7 |
| para-tertiary butyl benzoic acid | 55.8 |
| xylene | 5.0 |
| triethylamine | 5.8 |
| deionized water | 409.0 |

[1]Polyethylene glycol, commercially available from Union Carbide Corporation having a molecular weight within the range of 3000-3700.

The aqueous alkyd dispersion was prepared in a typical alkyd resin reaction vessel equipped for azeotropic distillation. The safflower oil and 15.7 parts of the pentaerythritol were charged to the reaction vessel under a nitrogen blanket and alcoholyzed using 0.54 parts of lithium naphthanate, heating to 440° F. (227° C.) until a clear point of 1 to 4 was obtained in cold denatured ethanol (50° F. (10° C.)). The isophthalic acid, phthalic anhydride, remaining pentaerythritol, CARBOWAX 4000, paratertiary butyl benzoic acid, dibutyltin oxide and xylene were then charged to the reaction vessel and the charge heated to 400° F. (204° C.) with agitation until an acid number of 25 was obtained. The reaction mixture was then sparged with nitrogen and the xylene azeotropically distilled until the reaction mixture had an acid value of 20. The reaction mixture was then neutralized with the triethylamine and dispersed in deionized water to form a product which had a pH of about 6.9 and a solids content of about 40 percent.

The aqueous alkyd dispersion prepared as described above was aged at 72° F. (22° C.) for 30 days and another sample aged at 120° F. (49° C.) for 30 days. The changes in milliequivalents of acid and base, as well as the changes in acid value and percentage solids is reported in the table below.

For the purposes of comparison, 2.5 percent by weight (based on polyester resin solids) of 2,2',6,6'-tetraisopropyl-diphenyl carbodiimide was added to the aqueous alkyd as a 25 percent solids solution in butyl CELLOSOLVE. The carbodiimide-containing alkyd was then aged at 72° F. (22° C.) for 30 days and another sample aged at 120° F. (49° C.) for 30 days. The changes in milliequivalents of acid, base, as well as the changes in acid value and percentage solids is reported in the table below.

Table

Stabilizing Effect of 2,2',6,6'-Tetraisopropyl-diphenyl Carbodiimide on Aqueous Alkyd Dispersions

| | Aqueous Alkyd Dispersion | | Aqueous Alkyd Dispersion Plus Carbodiimide | |
| --- | --- | --- | --- | --- |
| | 30 days at 72° F. (22° C.) | 30 days at 120° F. (49° C.) | 30 days at 72° F. (22° C.) | 30 days at 120° F. (49° C.) |
| Milli-equivalents of acid | 0.211 | 0.292 | 0.211 | 0.190 |
| Milli-equivalents of base | 0.093 | 0.111 | 0.093 | 0.113 |
| % solids | 37.9 | 38.3 | 37.9 | 39.0 |
| Acid value[1] | 31.2 | 42.8 | 30.3 | 27.2 |

Table-continued

Stabilizing Effect of 2,2',6,6'-Tetraisopropyl-diphenyl Carbodiimide on Aqueous Alkyd Dispersions

| | Aqueous Alkyd Dispersion | | Aqueous Alkyd Dispersion Plus Carbodiimide | |
| --- | --- | --- | --- | --- |
| | 30 days at 72° F. (22° C.) | 30 days at 120° F. (49° C.) | 30 days at 72° F. (22° C.) | 30 days at 120° F. (49° C.) |
| Δ acid value[2] | +37.2% | | −10% | |

[1]Acid value determined on 100% resin solids ASTM D-1639-70.
[2]Δ acid value is the change in acid value between sample aged at 72° F. (22° C.) for 30 days and sample aged at 120° F. (49° C.) for 30 days.

I claim:
1. A method for stabilizing aqueous dispersions of organic ester-containing compositions against degradation which comprises adding to said aqueous dispersion a stabilizing amount of a monocarbodiimide.
2. The method of claim 1 in which the organic ester-containing composition is a polymer having repeating ester linkages in the polymer backbone.
3. The method of claim 2 in which the polymer is selected from the class consisting of polyesters including alkyds and poly(ester-urethanes).
4. The method according to claim 1 in which the carbodiimide has aromatic and/or cycloaliphatic substituents substituted in the 2 and 2' position.
5. The method of claim 4 in which the carbodiimide is selected from the class consisting of substituted phenylmonocarbodiimides and cyclohexylmonocarbodiimides.
6. The method of claim 5 in which the monocarbodiimides are substituted with alkyl groups.
7. The method of claim 6 in which the alkyl-substituted monocarbodiimide is 2,2',6,6'-tetraisopropyl-diphenyl carbodiimide.
8. The method of claim 1 in which the aqueous dispersion contains at least 30 percent water based on total weight of the aqueous medium.
9. The method of claim 1 in which the carbodiimide is present in the aqueous dispersion in an amount of 0.1 to 10 percent by weight based on weight of the organic ester.
10. The method of claim 1 in which the carbodiimide is dissolved in a solvent miscible with the organic ester-containing composition and the solution added to the aqueous dispersion of the organic ester-containing composition.
11. An aqueous dispersion of an organic ester-containing composition prepared according to the method of claim 1.
12. The aqueous dispersion of claim 11 in which the organic ester-containing composition is a polymer having repeating ester units in the polymer backbone.
13. The aqueous dispersion of claim 12 in which the polymer is selected from the class consisting of polyesters including alkyds and poly(ester-urethanes).
14. The aqueous dispersion of claim 11 in which the carbodiimide has aromatic and/or cycloaliphatic substituents substituted in the 2 and 2' position.
15. The aqueous dispersion of claim 14 in which the carbodiimide is selected from the class consisting of phenylmonocarbodiimides and cyclohexylmonocarbodiimides.
16. The aqueous dispersion of claim 15 in which the monocarbodiimides are substituted with alkyl groups.
17. The aqueous dispersion of claim 16 in which the alkyl-substituted monocarbodiimide is 2,2',6,6'-tetraisopropyl-diphenyl carbodiimide.
18. The aqueous dispersion of claim 11 which contains at least 30 percent by weight water based on total weight of the aqueous dispersion.
19. The aqueous dispersion of claim 11 in which the carbodiimide is present in the aqueous dispersion in an amount of 0.1 to 10 percent by weight based on total weight of the organic ester.

* * * * *